United States Patent
Oyabu et al.

[11] Patent Number: 5,938,265
[45] Date of Patent: Aug. 17, 1999

[54] VEHICLE SEAT STRUCTURE

[75] Inventors: Masanori Oyabu, Toyota; Manabu Hashimoto, Shohara; Masaharu Tanino, Toyota; Sadao Ito, Anjo; Haruo Kato, Kariya, all of Japan

[73] Assignees: Toyota Jidosha Kabushiki Kaisha, Toyota, Japan; Aisin Seiki Kabushiki Kaisha, Kariya, Japan

[21] Appl. No.: 08/775,803

[22] Filed: Dec. 31, 1996

[30]       Foreign Application Priority Data

Feb. 8, 1996  [JP]  Japan ................................. 8-022509

[51] Int. Cl.⁶ ....................................................... B60N 2/42
[52] U.S. Cl. .................. 296/68.1; 296/189; 297/216.13; 297/452.2
[58] Field of Search ................................. 296/68.1, 188, 296/189; 297/216.1, 216.13, 452.18, 452.2

[56]             References Cited

U.S. PATENT DOCUMENTS

| | | | |
|---|---|---|---|
| 4,231,607 | 11/1980 | Bohlin | 296/63 |
| 5,407,244 | 4/1995 | Nakano et al. | 296/68.1 |
| 5,507,554 | 4/1996 | Nakano et al. | 297/216.13 |
| 5,584,525 | 12/1996 | Nakano et al. | 296/68.1 |
| 5,749,624 | 5/1998 | Yoshida | 297/216.13 X |

FOREIGN PATENT DOCUMENTS

| | | |
|---|---|---|
| 140177 | 5/1985 | European Pat. Off. . |
| 4421946 | 6/1995 | Germany . |
| 6-255414 | 9/1994 | Japan . |

*Primary Examiner*—Andrew C. Pike
*Attorney, Agent, or Firm*—Pillsbury Madison & Sutro LLP

[57]             ABSTRACT

A vehicle seat structure comprises: a connecting member which connects an outer side reclining apparatus in a widthwise direction of a vehicle and an inner side reclining apparatus in the widthwise direction of the vehicle to be interlocked with one another; a reinforcing member which is tubular and is provided adjacent to the connecting member, one end portion of the reinforcing member being fixed to a structural member of the outer side reclining apparatus and another end portion of the reinforcing member being fixed to a structural member of the inner side reclining apparatus; and deformation direction control apparatus for deforming the reinforcing member in a direction other than a direction in which a seating space of a vehicle occupant becomes narrower, when a side collision load is larger than a buckling load of the reinforcing member.

16 Claims, 12 Drawing Sheets

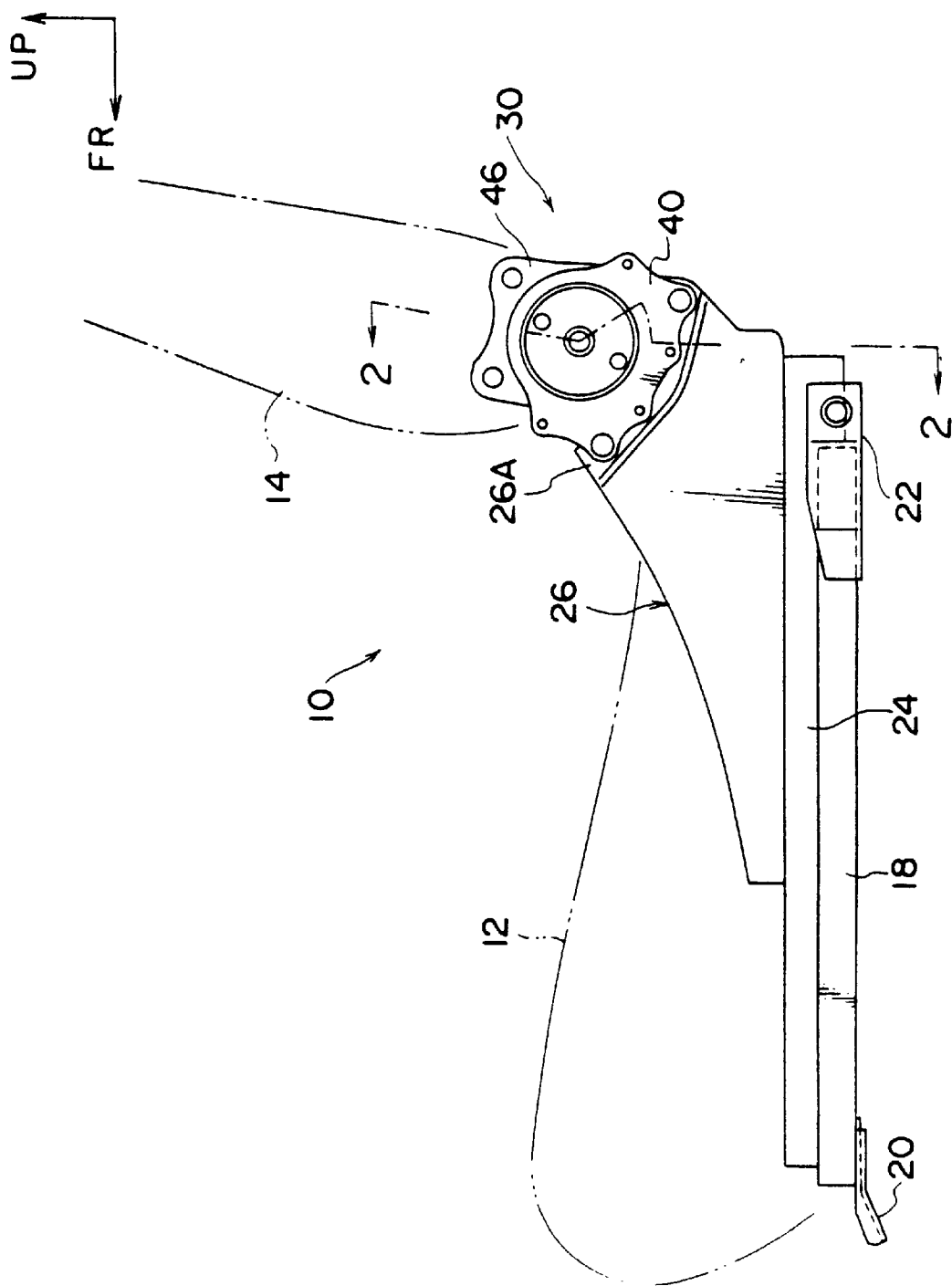

VEHICLE SEAT STRUCTURE

BACKGROUND OF THE INVENTION

1. Field of the Invention

The present invention relates to a seat structure for a vehicle (which is referred to a "vehicle seat structure", hereinafter) comprising a connecting member which connects a reclining apparatus at a widthwise direction outer side of a vehicle seat and a reclining apparatus at the widthwise direction inner side of the vehicle seat to interlock the reclining apparatuses with one another, and a reinforcing member which is tubular and provided adjacent to the connecting member, each end portion of the reinforcing member being fixed to the corresponding structural member of the respective reclining apparatus (hereinafter, the widthwise direction outer side will be referred to simply as the outer side, and the widthwise direction inner side will be referred to simply as the inner side).

2. Description of the Prior Art

Conventionally, various countermeasures have been taken against a side collision of a vehicle (which is referred to a "side collision" hereinafter when it is necessary). From a stand point of the vehicle seat structure, in general, such countermeasures have been taken in which rigidity of the vehicle seat structure is reinforced by increasing thicknesses of plates of a seat back frame which forms a main structure of a seat back and a seat cushion frame which forms a main structure of a seat cushion, and that supporting rigidity against a side collision load which acts on a vehicle is improved by adding a plurality of reinforcements to the vehicle seat structure. However, there exists a drawback in that thicknesses of plates of the seat back frame and the seat cushion frame as well as the number of structural members which are used for the vehicle seat structure are increased and the weight of the vehicle seat is increased accordingly.

Thus, methods of a vehicle seat structure in which a tubular member is disposed along the widthwise direction of the vehicle seat and prevents the aforementioned demerit such as the increase in the weight of the vehicle seat or the like have been disclosed (e.g. in U.S. Pat. Nos. 4,231,607, 5,407,244, and 5,507,554, etc.). A description of vehicle seat structures as disclosed in the publications of U.S. Pat. Nos. 5,407,244 and 5,507,554 will be given in detail hereinafter.

A schematic front view of a front seat 100 for a driver's seat is shown in FIG. 11. As shown in this figure, the front seat 100 is comprised of a seat cushion 102, a seat back 106 which is disposed in a upright state at the rear end portion of the seat cushion 102 and which can be tilted by a reclining apparatus 104, and a headrest 108 which is provided at the upper end portion of the seat back 106 and which can be adjusted to move in the upper and lower directions thereof.

A seat sliding apparatus 110 is provided at the lower end portion of the seat cushion 102. The seat sliding apparatus 110 is comprised of a pair of lower rails 116 which are fixed to a floor panel 112 via a pair of brackets 114, and a pair of upper rails 118 which are provided at the lower end portion of the seat cushion 102 and which are fitted into the lower rails 116. Accordingly, although the front seat 100 is slidable in the longitudinal direction of a vehicle, in the widthwise direction of the vehicle, the front seat 100 is supported to be immobilized.

A seat back frame 120 which serves as a frame of the seat back 106 is frame-shaped. A singular and tubular reinforcing member 122 is disposed at a lower end portion 120A of the seat back frame 120 via a pair of brackets 124. The longitudinal direction of the reinforcing member 122 is along with the widthwise direction of the seat back 106. A load input portion 126 and a load output portion 128 having a disc-shaped configuration are fixed to each end portion of the reinforcing member 122, respectively. The load input portion 126 and the load output portion 128 are disposed in vicinities of reclining lower arms 130, which form a part of the reclining apparatus 104, and are disposed at the rear end and widthwise direction ends of the seat cushion 102. A predetermined interval is provided between the load input portion 126 and one of the reclining lower arms 130, and between the load output portion 128 and the other reclining lower arm 130.

According to the aforementioned structure, as shown in FIG. 12, when a side door 132 of a vehicle at a normal position (i.e., the position is drawn by a dual dotted broken line) is hit by a front bumper 136 of another vehicle body 134, the side door 132 is deformed toward a vehicle interior side (i.e., from a position indicated by the dual dotted broken line to a position indicated by a single dotted broken line). For this reason, the inner panel of the side door 132 abuts the external end portion of the reclining apparatus 104 of the front seat 100, and the reclining lower arm 130 is displaced and abuts the load input portion 126. Therefore, the reinforcing member 122 is displaced toward a reinforced console box 138 side or a floor tunnel 200 side (i.e., inwardly in the transverse direction of the vehicle), so that the load output portion 128 is caused to abut the other reclining lower arm 130 (which is disposed inwardly of the vehicle in the widthwise direction thereof). In this way, the side collision load, while being absorbed and decreased, is transmitted to the reinforced console box 138 side to a front passenger seat through the reinforcing member 122, finally to a floor panel 112 and the side collision load is thereby absorbed. As a result, the crash of the front seat 100 in the widthwise direction of the vehicle seat is prevented.

However, when the side collision load input to the reinforcing member 122 through the load input portion 126 is larger than the buckling load of the reinforcing member 122, it is possible that the reinforcing member 122 bends largely at the longitudinal central portion thereof. However, according to the aforementioned vehicle seat structure, because the deformation direction of the reinforcing member 122 is not specified, depending on the cases, the reinforcing member 122 may deform toward the vehicle occupant side to reduce the seating space of the vehicle occupant.

SUMMARY OF THE INVENTION

In view of the aforementioned facts, it is an object to provide a vehicle seat structure in which a seating space of a vehicle occupant can be obtained even when a side collision load is larger than a buckling load of a reinforcing member.

The first aspect of the present invention is a vehicle seat structure comprising a connecting member which connects an outer side reclining apparatus in a widthwise direction of a vehicle and an inner side reclining apparatus in the widthwise direction of the vehicle to be interlocked with one another; a reinforcing member which is tubular and is provided adjacent to the connecting member, one end portion of the reinforcing member being fixed to a structural member of the outer side reclining apparatus and another end portion of the reinforcing member being fixed to a structural member of the inner side reclining apparatus; and deformation direction control means for deforming the reinforcing member in a direction other than a direction in which a seating space of a vehicle occupant becomes narrower, when a side collision load is larger than a buckling load of the reinforcing member.

The second aspect of the present invention is a vehicle seat structure according to the first aspect of the present invention, in which the reinforcing member is disposed at the outer peripheral portion of the connecting member.

The third aspect of the present invention is a vehicle seat structure according to the first or second aspect of the present invention, wherein the reinforcing member has mounting portions, each of the mounting portions being provided at an end of the reinforcing member, one of the mounting portions being fixed to a structural member of the outer side reclining apparatus and another of the mounting portions being fixed to a structural member of the inner side reclining apparatus, and the mounting portions being provided so as to extend in a direction orthogonal to an axial direction of the reinforcing member.

The fourth aspect of the present invention is a vehicle seat structure according to the third aspect of the present invention, wherein the deformation direction control means fixes the mounting portions such that a load input point of a side collision load acting on the mounting portions is positioned further toward a front of the vehicle than an axis of the reinforcing member.

The fifth aspect of the present invention is a vehicle seat structure according to any one of the above described aspects, wherein the cross-sectional configuration of the reinforcing member is formed such that the flexural rigidity of the reinforcing member in the longitudinal direction of a vehicle is larger than the flexural rigidity of the reinforcing member in the vertical direction of the vehicle.

In accordance with the first aspect of the present invention, when the side collision has occurred to the vehicle, one end portion of the connecting member is fixed to a structural member of the outer side reclining apparatus and another end portion of the connecting member is fixed to a structural member of the inner side reclining apparatus and the side collision load is thereby input to the reinforcing member. In this case, when the side collision load is larger than the buckling load of the reinforcing member, the reinforcing member is subjected to the buckling deformation. According to the present invention, there is provided the deformation direction control means for deforming the reinforcing member in a direction other than a direction in which the seating space of the vehicle occupant becomes narrower. As a result, the seating space of the vehicle occupant is reliably obtained.

When the side collision load which is input to the reinforcing member is smaller than the buckling load of the reinforcing member, the reinforcing member is not subjected to the buckling deformation and supports the side collision load, so that the seating space of the vehicle occupant is not made narrower.

In accordance with the second aspect of the present invention, there is provided the vehicle seat structure according to the first aspect of the present invention in which the tubular reinforcing member is provided at the outer peripheral portion of the connecting member, the reinforcing member can thereby serve as a protecting member of the connecting member. Therefore, an excellent effect can be obtained in that the deformation of the connecting member toward a front or rear of the vehicle due to a head-on collision load at the time of a head-on collision of the vehicle and a rear end collision load at the time of a rear end collision of the vehicle can be prevented.

Further, in accordance with the second aspect, the tubular reinforcing member is provided at the outer peripheral portion of the connecting member to be coaxial with the connecting member. In this case, the vehicle seat structure can be made more compact than in a case in which the reinforcing member is provided at the outer peripheral portion of the connecting member and is not coaxial with the connecting member. As a result, an excellent effect can be obtained in that the vehicle seat structure does not impinge on the space available for the legs of a vehicle occupant on a rear seat.

In accordance with the third aspect of the present invention according to the first and second aspects of the present invention, the reinforcing member has mounting portions at each end portion thereof, each of the mounting portions is provided at an end of the reinforcing member, one of the mounting portions is fixed to a structural member of the outer side reclining apparatus and another of the mounting portions is fixed to a structural member of the inner side reclining apparatus, and the mounting portions are provided so as to extend in the direction orthogonal to the axial direction of the reinforcing member. In this case, effective fixing area can be made larger than in a case in which the reinforcing member has no mounting portions at the end portions thereof and is directly fixed to a structural member of each of the reclining apparatuses. As a result, a vehicle seat rigidity and a riding comfort of the vehicle occupant seated on the seat are improved.

In accordance with the fourth aspect of the present invention according to the third aspect of the present invention, the deformation direction control means fixes the mounting portions such that the load input point of the side collision load acting on each of the mounting portions is positioned further toward a front of the vehicle than an axis of the reinforcing member. Accordingly, by changing the configuration or the like of each of the mounting portions, the position of the fixing point, which determines the load input point of a side collision load, can be set arbitrarily, so that the degrees of freedom in setting the load input point of a side collision load increase. As a result, tuning of the reinforcing member in the buckling deformation direction can be facilitated.

In accordance with the fifth aspect of the present invention according to any one of the above aspects of the present invention, the cross-sectional configuration of the reinforcing member is formed such that the flexural rigidity of the reinforcing member in the longitudinal direction of a vehicle is larger than the flexural rigidity of the reinforcing member in the vertical direction of the vehicle. Accordingly, by arbitrarily choosing the cross-sectional configuration of a reinforcing member which determines the flexural rigidity of the reinforcing member, the degrees of freedom in setting flexural rigidities in the longitudinal and vertical directions of the vehicle increase. As a result, tuning of the reinforcing member in the buckling deformation direction can be facilitated.

BRIEF DESCRIPTION OF THE DRAWINGS

FIG. 5 is a schematic side view of the front seat according to the first embodiment of the present invention;

FIG. 13 is a front view of a front seat which illustrates a vehicle seat structure according to a prior art embodiment; and FIG. 14 is a front view of a front seat for explaining operation in a case in which the vehicle seat structure of FIG. 11 is employed.

DESCRIPTION OF THE PREFERRED EMBODIMENT

A description will be given of a first embodiment of the present invention in detail hereinafter with reference to FIGS. 1 through 8. In these figures, it should be noted that an arrow "FR" points toward the front of a vehicle, an arrow "UP" points toward the top of the vehicle, and an arrow "IN" points toward the interior of the vehicle.

Figure 8:
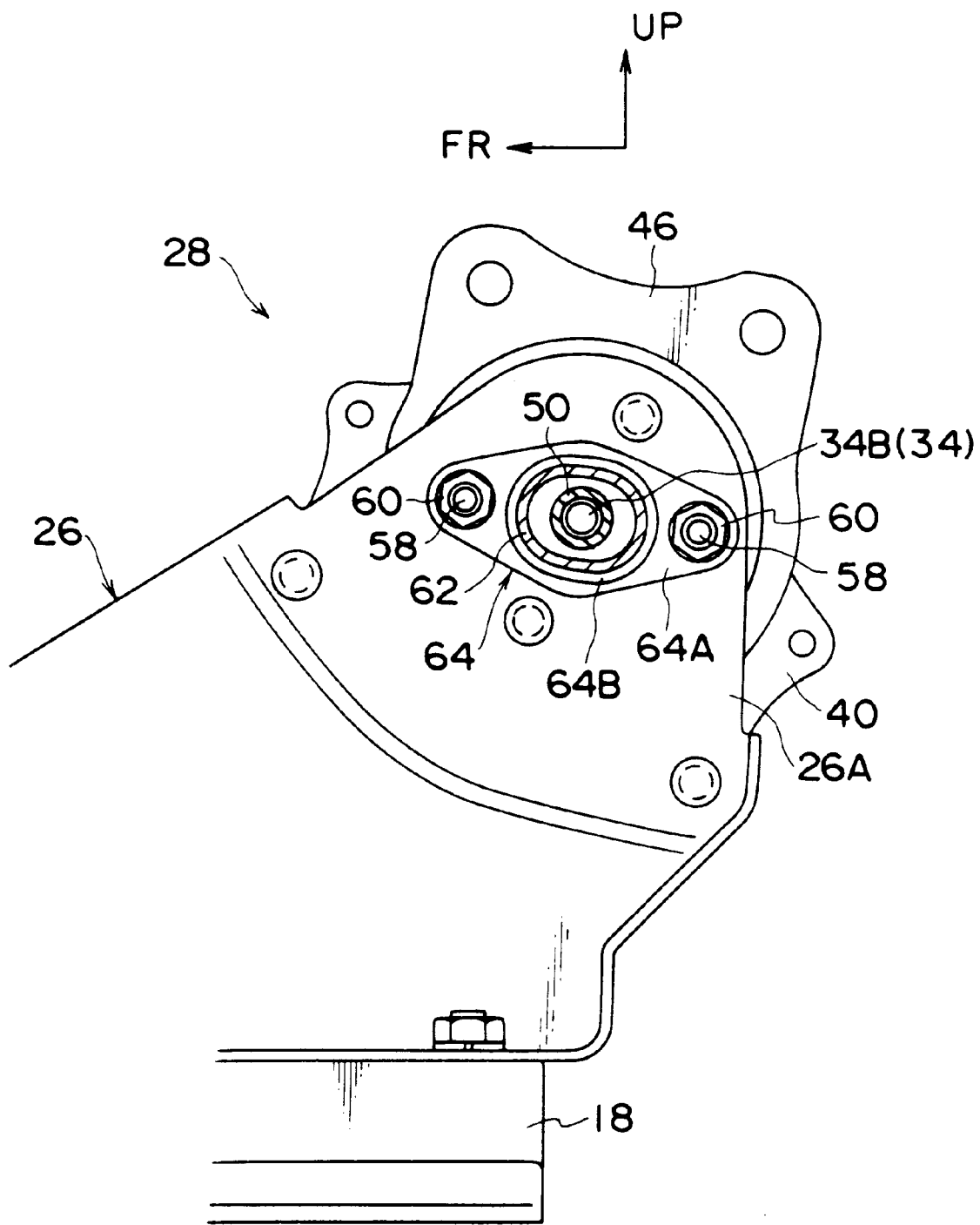
FIG. 8 is a schematic side view of the front seat which illustrates the relation between the buckling deformation direction of the reinforcing member according to the first embodiment of the present invention and a vehicle occupant.

A schematic side view of a front seat 10 to which the present invention is applied is shown in FIGS. 5 and 8, respectively. As shown in these figures, the front seat 10 is comprised of a seat cushion 12 on which a vehicle occupant is seated, a seat back 14 which is disposed in a upright state at the back end portion of the seat cushion 12 in the longitudinal direction of a vehicle and is used as a backrest for the vehicle occupant, and a headrest 16 which is provided at the upper end portion of the seat back 14 and is adjustable to be raised and lowered.

Figure 2:
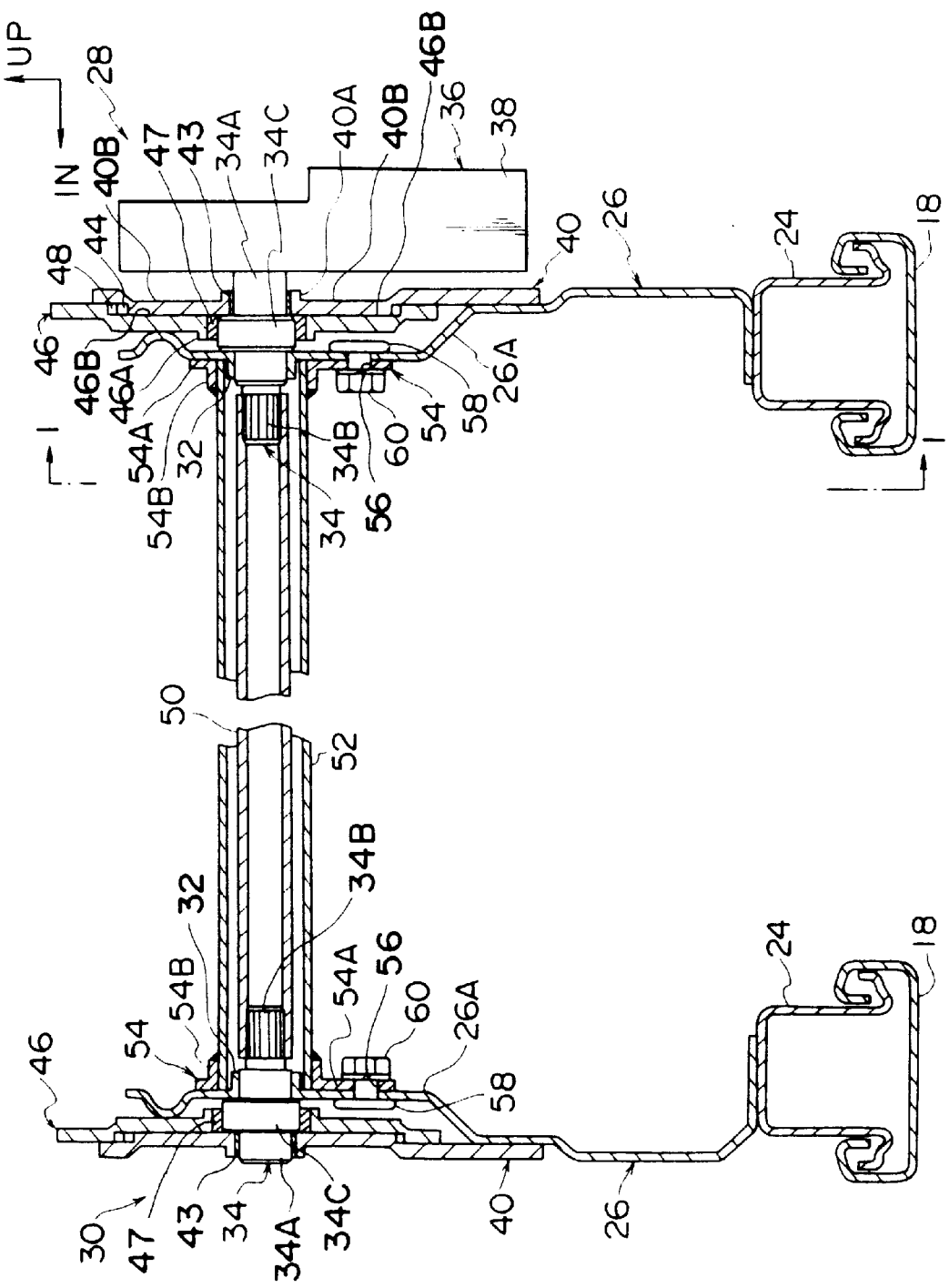
FIG. 2 is an enlarged cross-sectional view taken along line 2—2 of FIG. 5 and illustrates a lower structure of the front seat.
Figure 3:
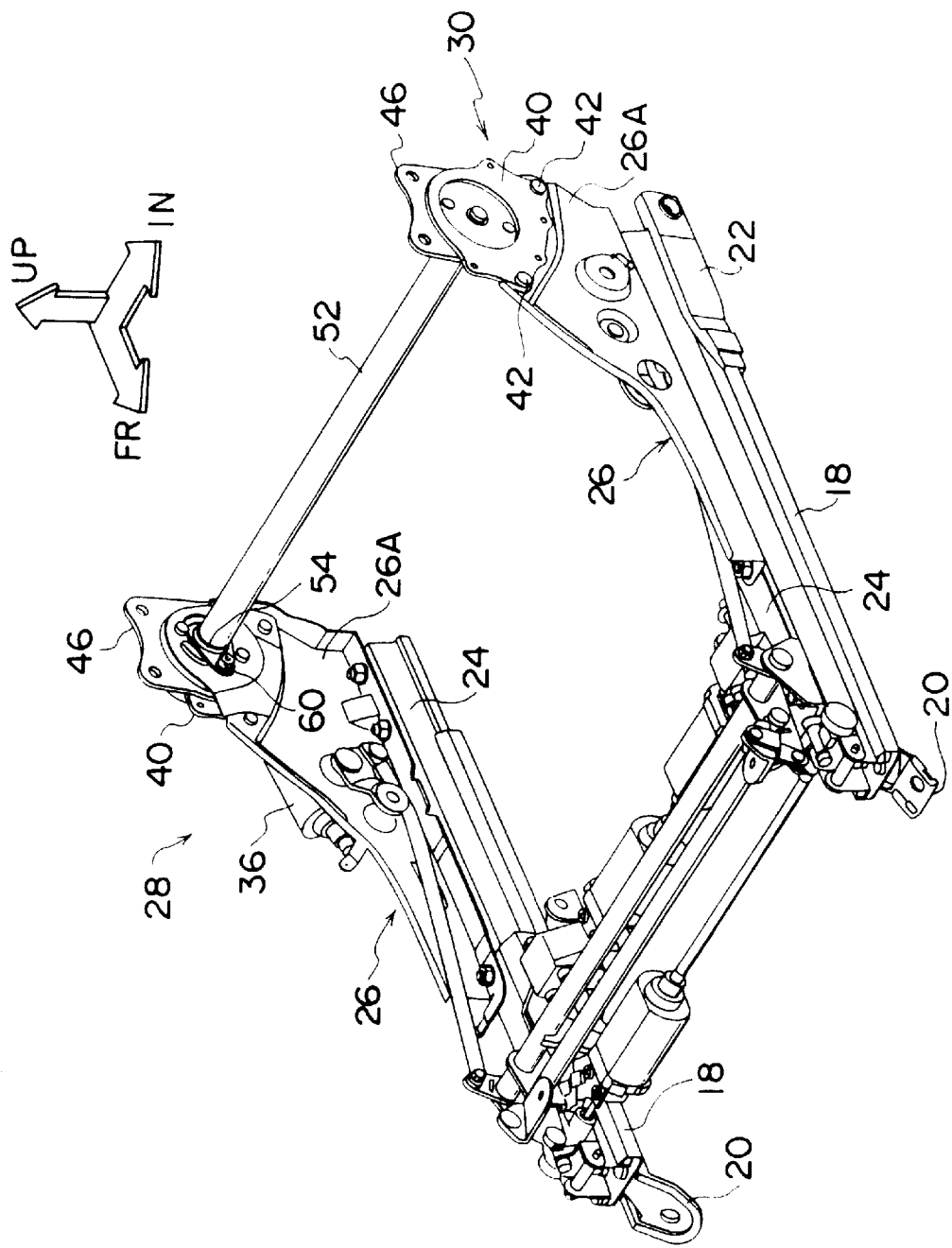
FIG. 3 is a perspective view illustrating an assembled state of the lower structure in the front seat of FIG. 2.
Figure 4:
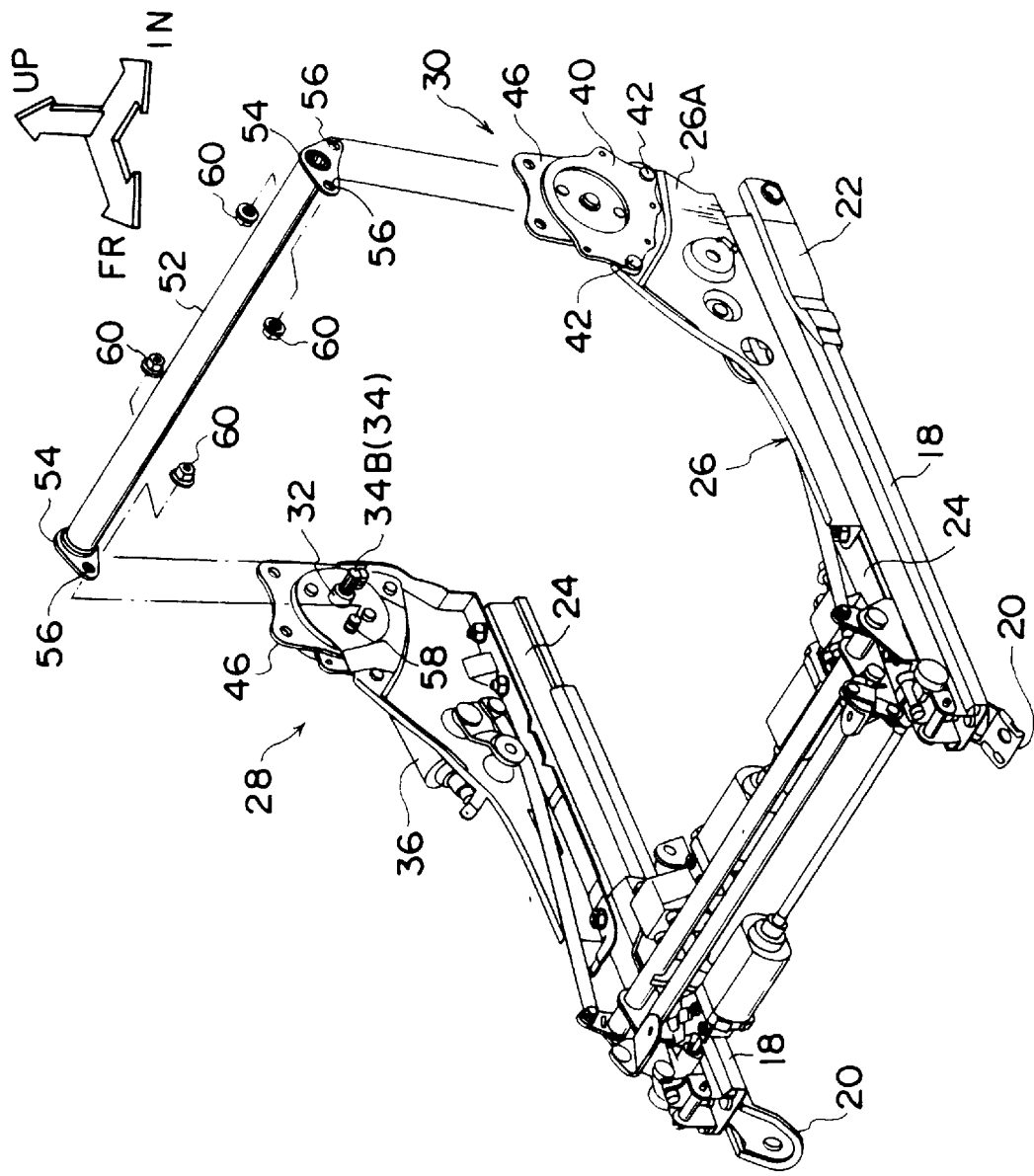
FIG. 4 is a perspective view illustrating a separated state of a connecting rod and a reinforcing member in the lower structure of the front seat of FIG. 3.

FIG. 3 shows an assembled state of a lower structure of the lower portion of the front seat 10, FIG. 4 shows a partially exploded perspective view of the lower structure, and FIG. 2 shows a longitudinal sectional view of the lower structure thereof taken along the line 2—2 in FIG. 5. As shown in these figures, a pair of lower rails 18 having a substantially U-shaped cross-sectional configuration is provided at the bottom portions of the seat cushion 12 and is fixed to a floor panel of the vehicle through brackets 20 and brackets 22, the brackets 20, 22 being disposed in the longitudinal direction of the lower rails 18, respectively. A pair of upper rails 24 each having a substantially hat-shaped cross-sectional configuration are inserted and fitted into the respective lower rails 18 to be slidable in the longitudinal directions thereof. A pair of base plates 26 are fixed to the upper end surfaces of the upper rails 24, respectively. Each of the base plates 26 has a substantially L-shaped cross-sectional configuration and the longitudinal direction of the base plate 26 corresponds to the longitudinal direction of the vehicle. Moreover, a back end portion 26A of the base plate 26 extends from a front end portion of the base plate 26 to the vehicle upper side (i.e., the seat back 14 side).

An outer side reclining apparatus 28 is disposed at the back end portion 26A of an outer side base plate 26. An inner side reclining apparatus 30 is disposed at the back end portion 26A of an inner side base plate 26. Basically, the inner side reclining apparatus 30 and the outer side reclining apparatus 28 have the same structure. Accordingly, although the structure of the inner side reclining apparatus 30 may be described when it is necessary, the structure of the outer side reclining apparatus 28 will mainly be described.

As shown in FIG. 2, a cylindrical boss portion 32 is molded onto a substantially central portion of the back end portion 26A of the outer side base plate 26. A main shaft portion 34A of a hinge pin 34 is pivotally supported to the boss portion 32. The hinge pin 34 is comprised of the main shaft portion 34A, a fitting portion 34B which has a serration on the outer peripheral surface thereof and which is provided at the internal end portion of the main shaft portion 34A to be coaxial therewith, and a cam portion 34C which is provided coaxially with the main shaft portion 34A at the middle portion thereof. The hinge pin 34 rotates axially by being subjected to a driving force from a driving apparatus 36. A brief description of an example of the structure of the driving apparatus 36 will be given hereinafter. The driving apparatus 36 is comprised of a housing 38, a reclining motor which is accommodated into the housing 38 and is driven and rotated by operating an unillustrated reclining switch, a driving gear which is rotated by receiving a driving force from the reclining motor, and a connecting gear which meshes with the driving gear and is fixed to the external end portion of the hinge pin 34 to rotate the hinge pin 34 in low speed.

Further, a flat plate-shaped lower gear 40 is fastened to an outside portion of the back end portion 26A of the outer side base plate 26 with fasteners 42 such as rivets or the like (see FIGS. 3 and 4). A cylindrical boss portion 40A is molded onto the central portion of the lower gear 40 and the main shaft portion 34A of the hinge pin 34 is inserted into the cylindrical boss portion 40A via a bearing member 43. Moreover, a bottom portion 40B is provided at a substantially central portion of the lower gear 40 including the boss portion 40A such that the bottom portion 40B is embossed toward the back end portion 26A to be formed into a bottomed cylindrical configuration. The bottom portion 40B also has an external gear 44 which is molded onto the outer peripheral portion thereof.

Further, an upper gear 46 is provided between the back end portion 26A of the base plate 26 and the lower gear 40. The upper gear 46 is fixed to the seat back 14 such that a cylindrical boss portion 46A is molded onto the central portion of the upper gear 46. An eccentric cam portion 34C whose central axis is eccentrically offset from that of the hinge pin 34 via a bearing member 47 by a predetermined distance is inserted into the boss portion 46A. A bottom portion 46B is provided at a substantially central portion of the upper gear 46 including the boss portion 46A such that the bottom portion 46B is embossed toward the back end portion 26A to be formed into a bottomed cylindrical configuration. The bottom portion 46B also has an internal gear 48 which is molded onto the internal peripheral portion thereof. The internal gear 48 of the upper gear 46 can mesh with a portion of the external gear 44 of the lower gear 40. The number of gear is set such that the number of the internal gear 48 of the upper gear 46 should have one more gear than the number of the external gear 44 of the lower gear 40. Therefore, as the hinge pin 34 rotates in the axial direction thereof, the cam portion 34C rotates eccentrically. Therefore, the upper gear 46 is allowed to receive a pressing force which acts on outwardly in the radial direction of the upper gear 46 and move swingably in the longitudinal direction of the vehicle by a portion of the external gear 44 being meshed with the internal gear 48. As a result, an angle at which the front seat 10 is reclined is changed.

As described above, the respective fitting portions 34B of the outer side hinge pin 34 and the inner side hinge pin 34 are connected by a tubular connecting rod 50 being fitted into serrations formed on each of these fitting portions 34B. Therefore, the outer side reclining apparatus 28 and the inner side reclining apparatus 30 are connected via the connecting rod 50, and the driving force from the outer side reclining apparatus 28 is transmitted to the inner side reclining apparatus 30.

As shown in FIGS. 2 through 4, a tubular reinforcing member 52 is inserted and attached to the outer peripheral portion of the aforementioned connecting rod 50 to be coaxial therewith. End portions of the reinforcing member 52 are press-fitted or inserted into each of plates 54 and then welded thereto. The plate 54 is comprised of a mounting portion 54A having a substantially triangular flat plate, and a cylindrical supporting portion 54B extending from a substantially central portion of the mounting portion 54A to a portion in the thickness direction of the plate 54. The internal diameter size of the supporting portion 54B is equivalent to the outer diameter size of the reinforcing member 52 such that an end portion of the reinforcing member 52 is press-fitted or inserted into the supporting portion 54B. A pair of mounting holes 56 are also formed in the vicinity of a corner portion of the mounting portion 54A.

Figure 1:
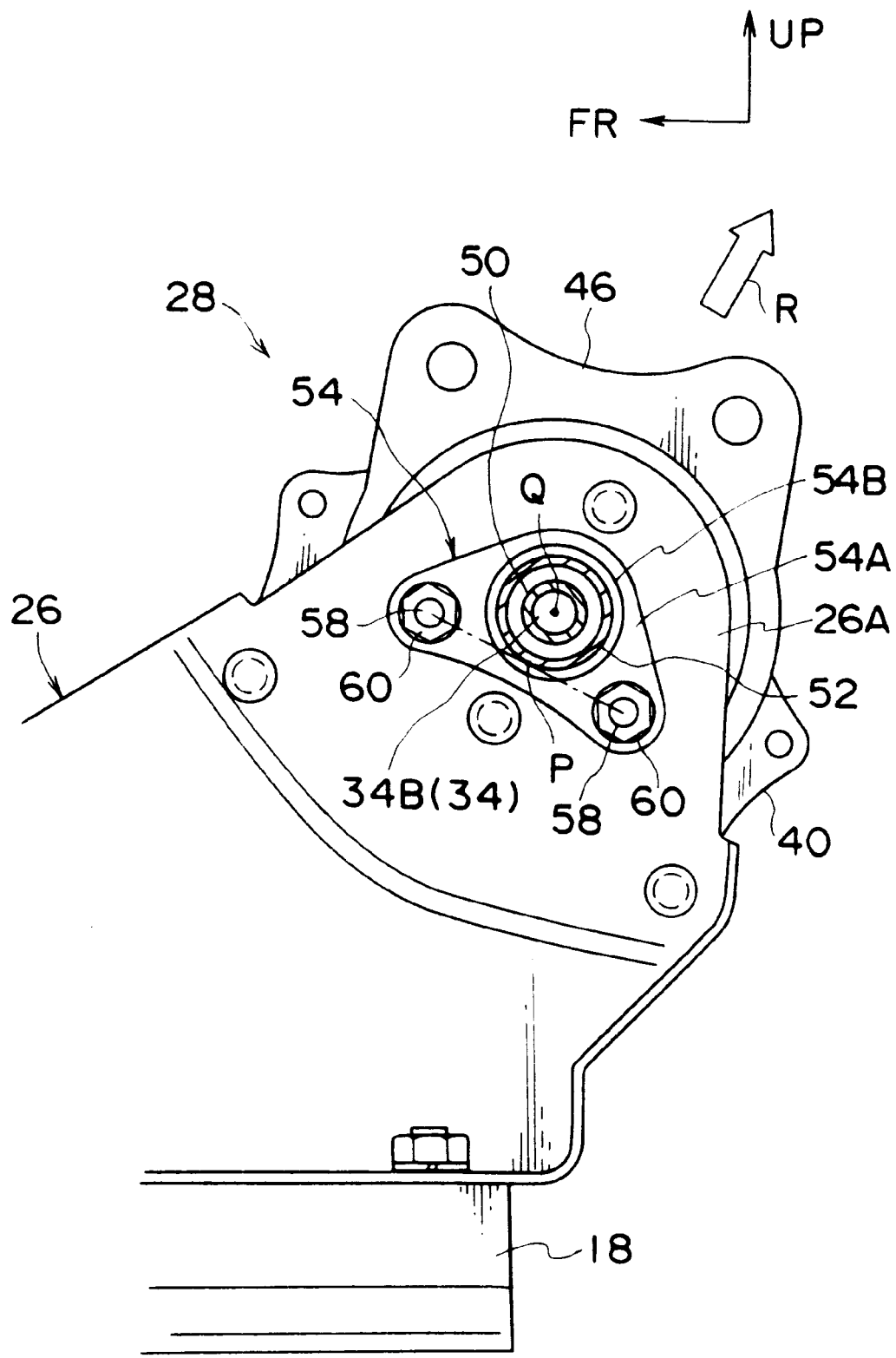
FIG. 1 is an enlarged cross-sectional view taken along line 1—1 of FIG. 2 and illustrates a main portion of a front seat structure according to a first embodiment of the present invention.

As shown in FIG. 1, the aforementioned plate 54 is fixed to a predetermined portion of the back end portion 26A of the base plate 26 with welding bolts 58 and nuts 60. More specifically, a pair of welding bolts 58 are fastened to the back end portion 26A of the base plate 26 from the outside of the vehicle in the widthwise direction thereof, so that the plate 54 is fixed to the base plate 26 by the welding bolts 58 being inserted into the pair of mounting holes 56 (see FIG. 4) of the base plate 26, respectively and by the nuts 60 being screwed onto the welding bolts 58.

Further, as shown in FIG. 1, a fixing position of the plate 54 to the base plate 26 is set such that a central point P of the line which connects a pair of points on which the aforementioned plate 54 is fixed to the base plate 26 (i.e., a pair of fixing points set by the welding bolts 58 and the nuts 60) is placed further toward a front of the vehicle (i.e., the vehicle occupant side) than the centroid Q of the reinforcing member 52.

Next, a description of an operation and an effect of the present embodiment will be given hereinafter.

When a side collision has occurred to a vehicle from the outside thereof, having the vehicle seat structure according to the aspects of the present invention, an inner door panel of the vehicle side door is forcibly deformed and protruded toward the front seat 10 side of the vehicle. For this reason, a side collision load is input into a side portion on the outer side portion of the front seat 10 via the inner door panel of the vehicle. In this case, in accordance with the present embodiment, since the reinforcing member 52 is provided to be coaxial with the connecting rod 50 at the outer peripheral portion thereof, when the side collision load which acts on the vehicle is smaller than a buckling load of the reinforcing member 52, the side collision load can be absorbed due to the rigidity of the reinforcing member 52. Accordingly, the reinforcing member 52 is not subjected to a buckling deformation and the seating space of a vehicle occupant on the front seat 10 can be maintained.

Figure 6A:
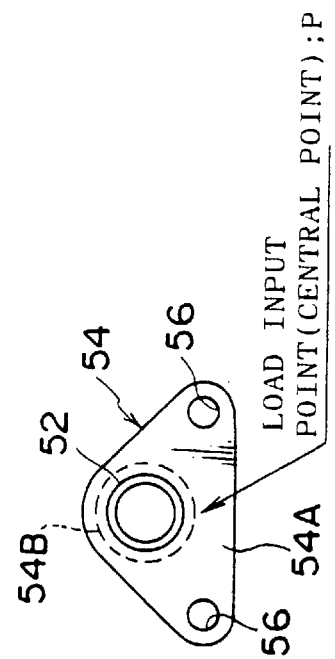
FIG. 6 is a side view of the reinforcing member and a plate which are used for a description of an operation of the first embodiment of the present invention.
Figure 6B:
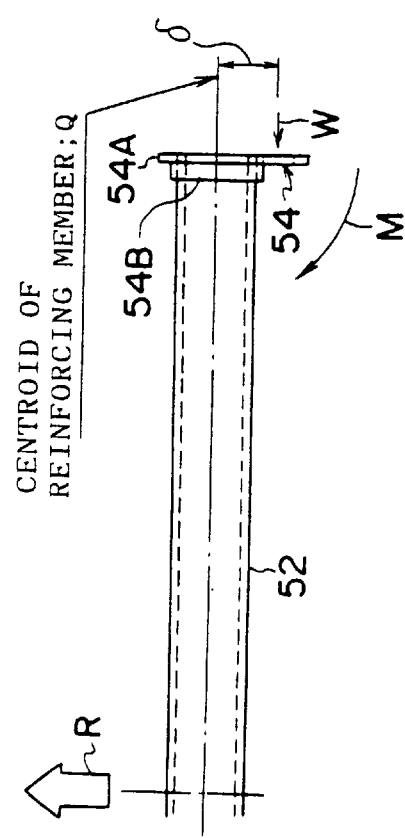
Figure 7:
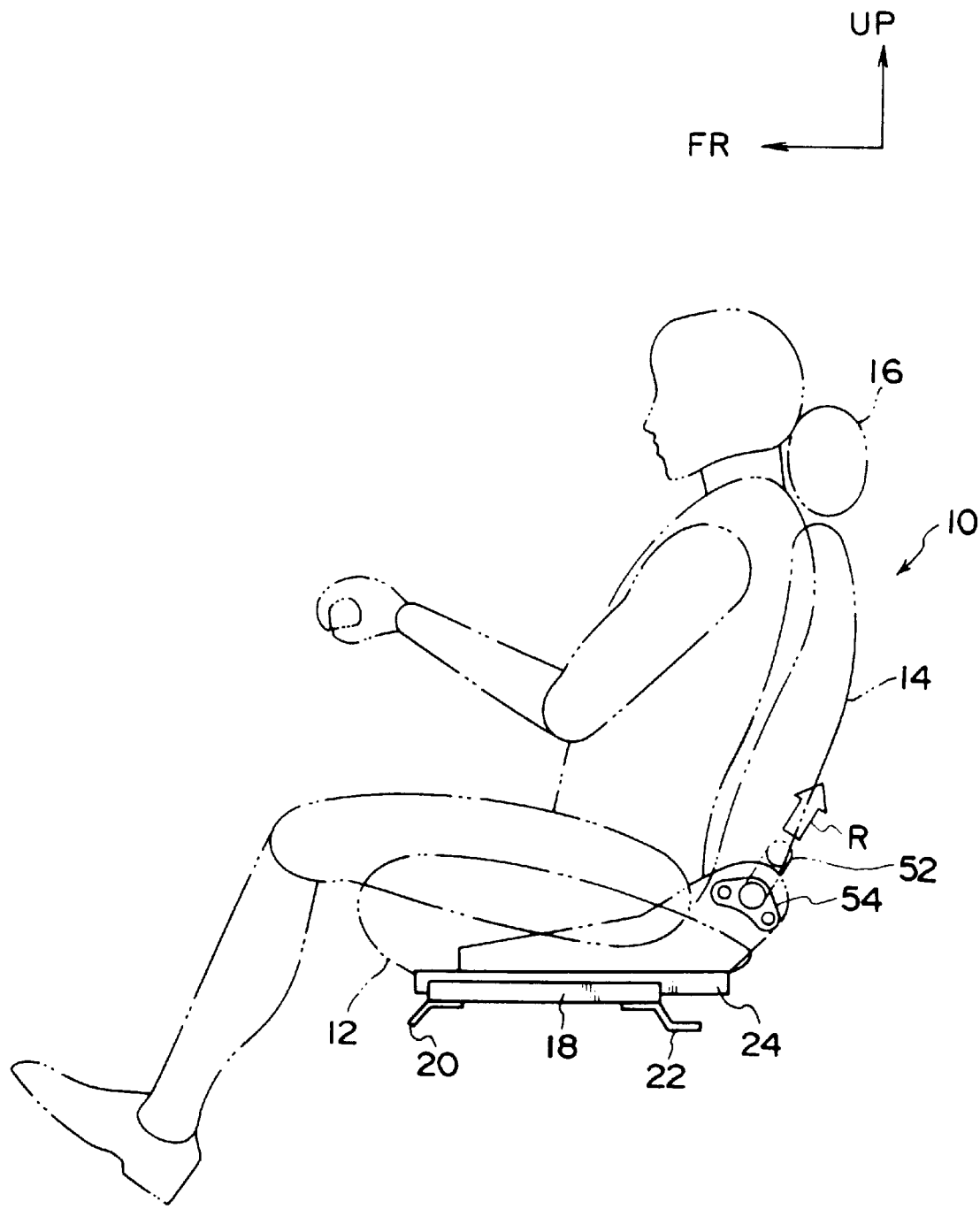
FIG. 7 is a front view of the reinforcing member and the plate which are used for a description of an operation of the first embodiment of the present invention.

On the other hand, when the side collision load which has been input to the vehicle is larger than the buckling load of the reinforcing member 52, the reinforcing member 52 is subjected to a buckling deformation. A description of the behavior of the reinforcing member 52 for this case will be given hereinafter. As shown in FIGS. 6 and 7, when the side collision load is input to the base plate 26 via the plate 54, a reacting force (i.e., the buckling load) W is generated and acts on the reinforcing member 52 via the mounting portion 54A of the plate 54. The mounting portion 54A is fixed to the base plate 26 by a pair of the welding bolts 58 and a pair of the nuts 60. Therefore, a center point P of a line which connects a pair of fastening points of the plate 54 may be represented as a load input point of the plate 54 into the mounting portion 54A. On the contrary, the centroid Q of the reinforcing member 52 is displaced or offset from the load input point (i.e., the central point) P by $\delta$. Accordingly, a predetermined flexural moment M ($=W\times\delta$) acts on the end portion of the reinforcing member 52. The reinforcing member 52 is subjected to a buckling deformation in the acting direction of the flexural moment M which corresponds to the direction which is indicated by an arrow R (which is shown in FIGS. 1 and 8), that is, the upper side and the diagonally rear side of the vehicle. Consequently, according to the present embodiment, even when the input side collision load is larger than the buckling load of the reinforcing member 52, the seating space of a vehicle occupant on the front seat 10 is not minimized, so that a reliable seating space can be obtained.

Further, the present embodiment is constituted such that a fixing position of the plate 54 to the base plate 26 is set at a position in which the load input point (i.e., a central point) P acting on the plate 54 which is fastened to the end portions of the reinforcing member 52 is placed at the vehicle front side (i.e., the vehicle occupant side) of the centroid Q of the reinforcing member 52, so that the buckling deformation direction of the reinforcing member 52 is controlled. Accordingly, the load input point (i.e., a central point) P of the plate 54 which determines the load input point P of the side collision load may freely be chosen by changing a configuration of the mounting portion 54A of the plate 54 or the like. Therefore, the degree of the freedom at which a position of the load input point P of the side collision load is set can be enhanced, so that the tuning of the reinforcing member 52 in the buckling deforming direction (i.e., the direction of the arrow indicated by R) can be facilitated.

As described above, the fundamental operation and effect according to the present embodiment have been described. However, in accordance with the present embodiment, the following operation and effect can also be presented.

Firstly, the present embodiment is constituted such that the tubular reinforcing member 52 is provided at the outer periphery of the connecting rod 50 to be coaxial therewith, the connecting rod 50 connects the outer side reclining apparatus 28 and the inner side reclining apparatus 30, and allows the reclining apparatuses to interlock with one another, so that the connecting rod 50 is stiffened or protected by the reinforcing member 52. Therefore, the deformation of the connecting rod 50 toward the vehicle rear side or the vehicle front side, which is caused by the head-on collision load at the time of the head-on collision of the vehicle and by the rear end collision load at the time of the rear end collision thereof, can be prevented.

Secondly, according to the present embodiment, because the tubular reinforcing member 52 is provided at the outer periphery of the connecting rod 50 to be coaxial therewith as described above, the reduction of the seat space of the vehicle having the above-described seat structure can be made more effectively than that having a seat structure in which the tubular reinforcing member 52 is provided at the outer periphery of the connecting rod 50 not to be coaxial therewith (e.g. offset disposition or the like). Therefore, the space at the back portion of the front seat 10 to accommodate legs of a vehicle occupant seated on the rear seat of the vehicle does not become narrower. In other words, the capacity in the lower space of the seat cushion 12 of the front seat 10 for accommodating the legs of the vehicle occupant seated on the rear seat is not interfered.

Thirdly, according to the first embodiment, the plates 54 are fixed to the end portions of the reinforcing member 52. Via the mounting portion 54A of each of the plates 54, the reinforcing member 52 is fixed to the back end portion 26A of each of the base plates 26 of the outer side reclining apparatus 28 and the inner side reclining apparatus 30 and a seating rigidity of the front seat 10 is increased. As a result, a riding comfort of a vehicle occupant seated on the front seat 10 is improved.

Hereinafter, a description of a second embodiment of the present invention will be given with reference to FIGS. 9 through 12. Portions which are identical to those shown in the first embodiment of the front seat 10', including seat cushion 12', seat back 14', headrest 16', lower rails 18', brackets 20' and 22', and upper rails 24', are denoted by the same reference numbers, (with a prime superscript indicating the second embodiment) and a description therefor will be omitted.

Figure 9A:
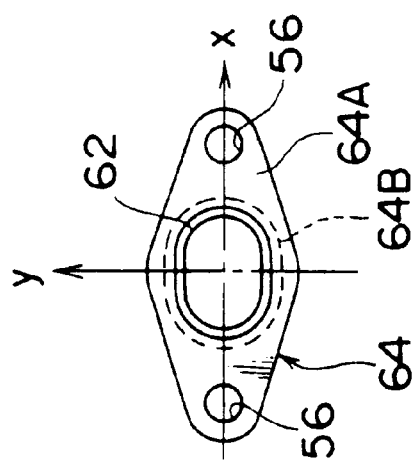
FIG. 9 is an enlarged cross-sectional view which corresponds to FIG. 1 and illustrates a main portion of a front seat structure according to a second embodiment of the present invention.
Figure 9B:
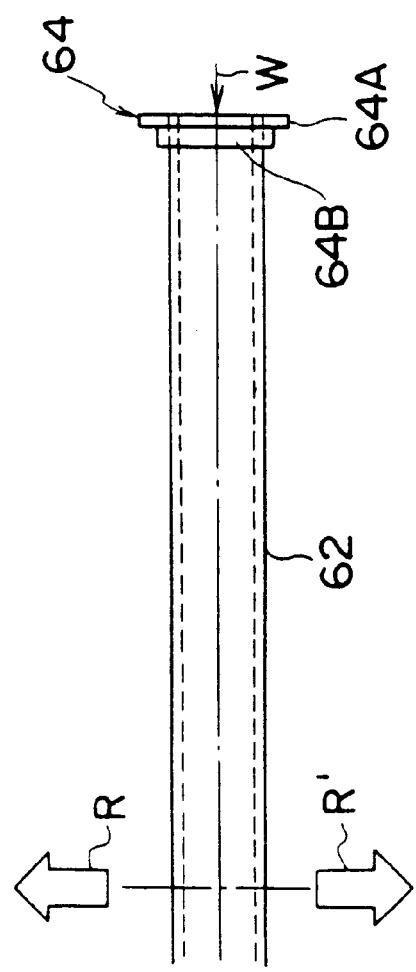
Figure 10:
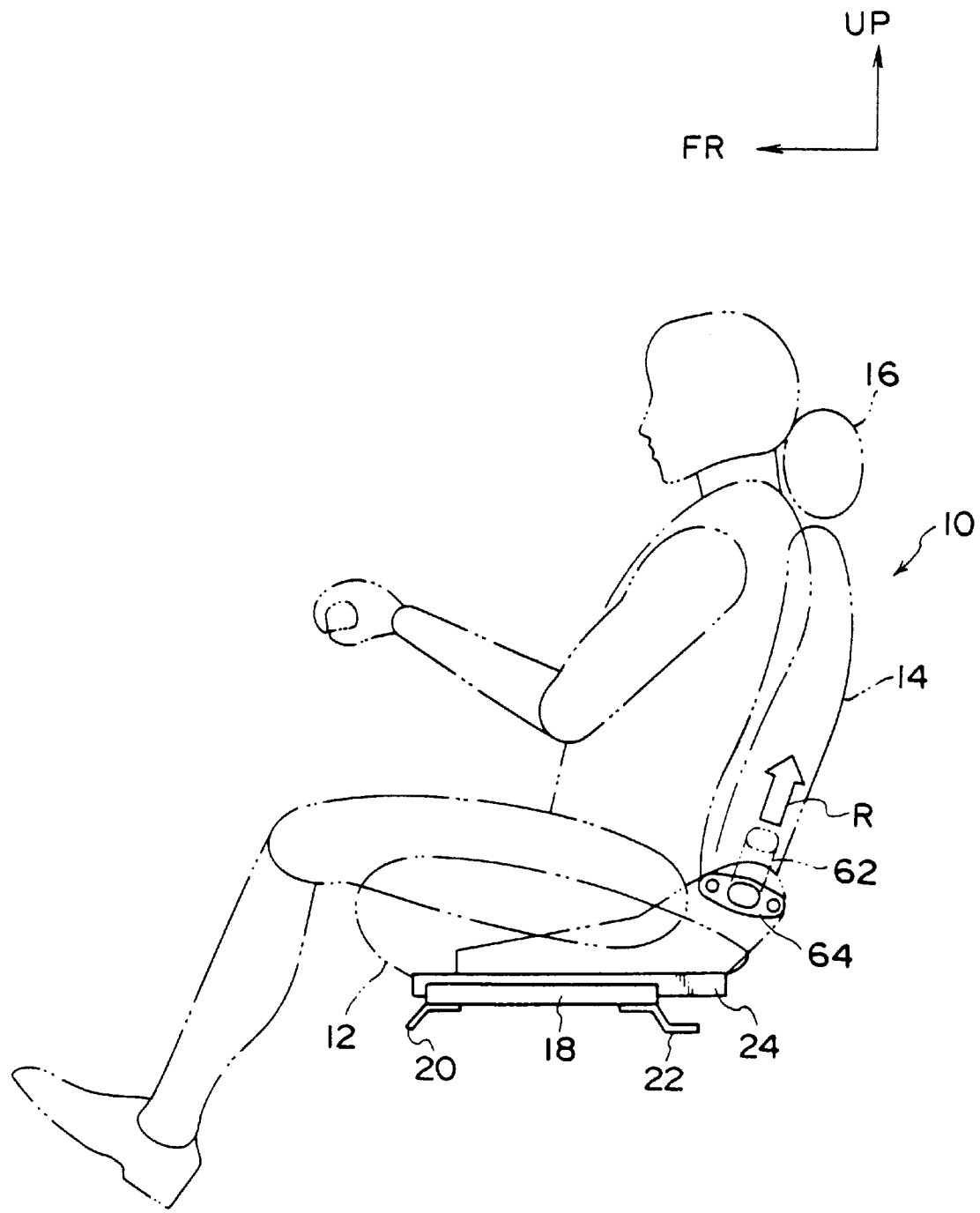
FIG. 10 is a side view of a reinforcing member and a plate which are used for a description of an operation of the second embodiment of the present invention.
Figure 11:
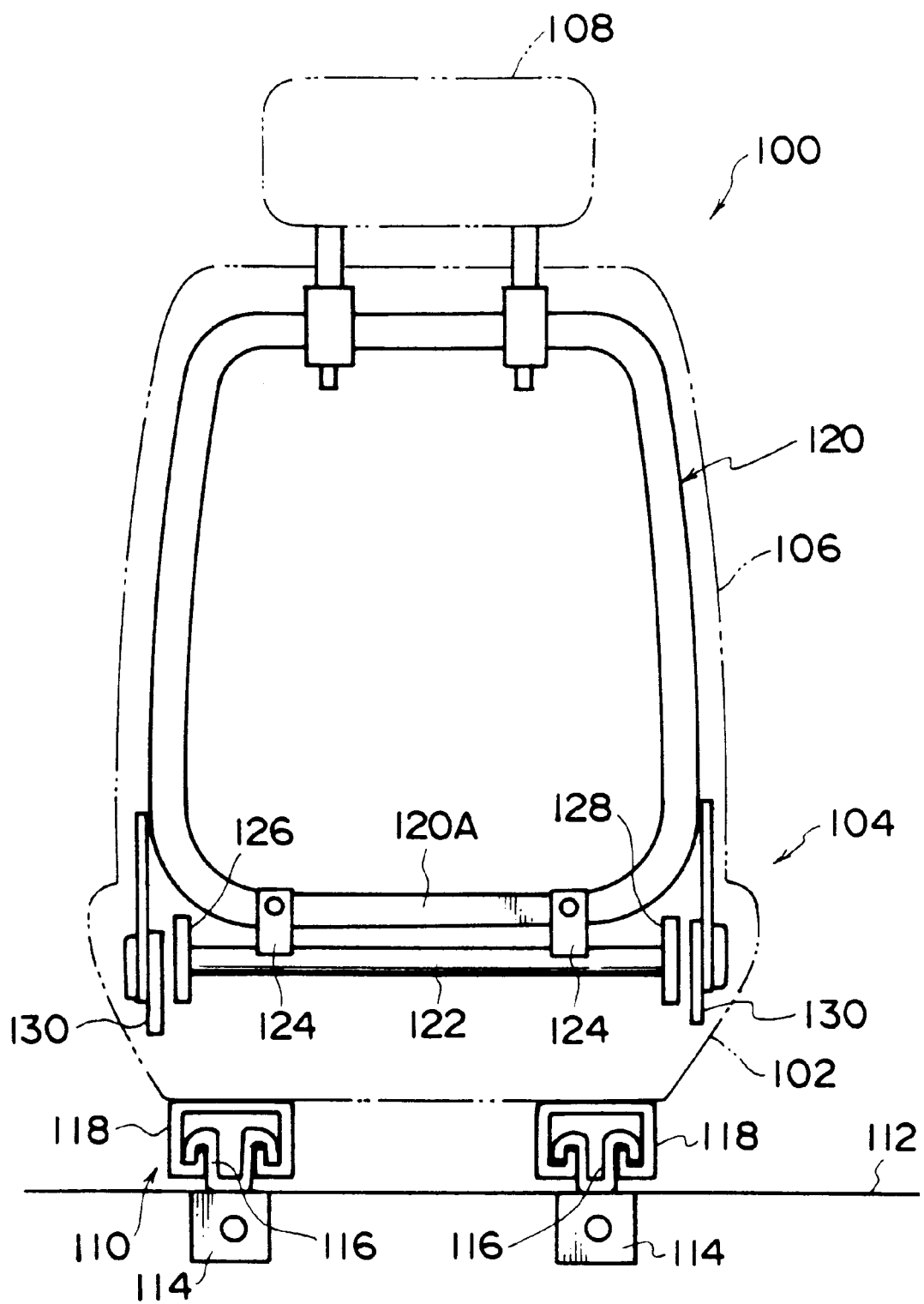
FIG. 11 is a front view of the reinforcing member and the plate which are used for a description of the operation of the second embodiment of the present invention.
Figure 12:
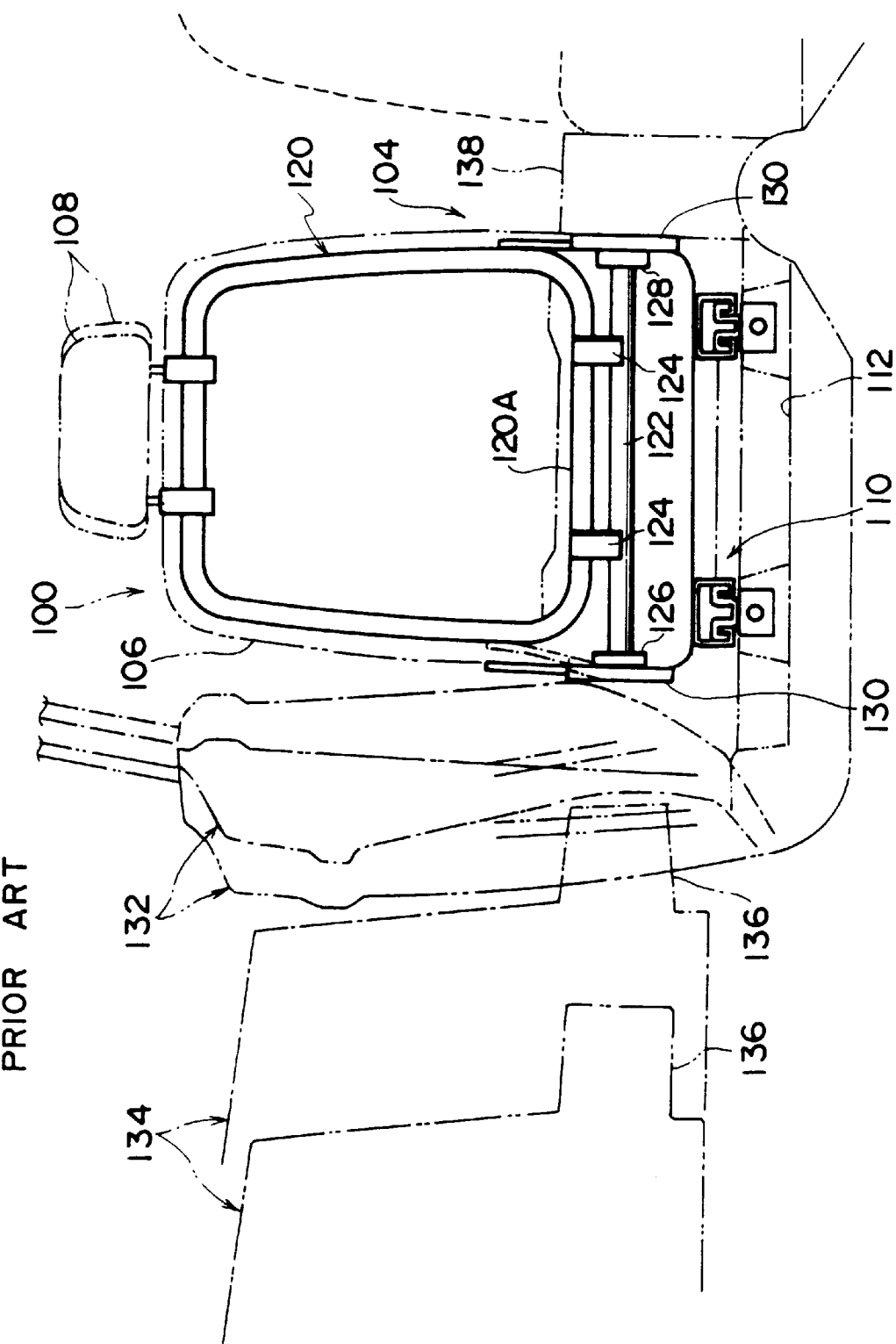
FIG. 12 is a schematic side view of the front seat which corresponds to FIG. 7 and illustrates the relation between the buckling deformation direction of the reinforcing member according to the second embodiment of the present invention and a vehicle occupant.

As shown in FIGS. 9, 10 and 11, in accordance with a second embodiment of the present invention, a tubular reinforcing member 62 is provided at the outer peripheral portion of the connecting rod 50' connecting fitting portions 34B' of hinge pins 34' and the cross section thereof is formed into a substantially oval-shaped configuration whose longitudinal axial direction is substantially directed in the longitudinal direction of the vehicle. The configuration of each of plates 64 which are fixed to the end portions of the reinforcing member 62 is changed in conformity with the cross-sectional configuration of the reinforcing member 62. More specifically, the plate 64 includes a fixing portion 64A having mounting holes 56', which has a substantially diamond and flat plate-shaped configuration and a supporting portion 64B which has a substantially oval cylindrical configuration. The supporting portion 64B protrudes gradually from the central portion of the fixing portion 64A in the thickness direction thereof, and each of the end portions of the reinforcing member 62 is press-fitted or inserted thereinto. Further, the plate 64 is fastened to the back end portion 26A' of the base plate 26' by the welding bolts 58' and the nuts 60' at the internal end portions at the corner portions of the fixing portion 64A in the thickness direction thereof.

Hence, typically, a buckling load of a long column can be determined from Euler's equation $\{\sigma = n\pi^2 E/(L/k)^2$, wherein (L/k) refers to a slenderness ratio$\}$ as follows:

the buckling load $W = n \times 90^2 \times E \times I_z/L^2$ (1)

wherein n: end-used requirement factor (if the end portions of the long column have hinged ends, n=1; on the other hand, if the end portions of the long column have fixed ends, n=4)

E: Young's modulus $I_z$: geometrical moment of inertia $E \times I_z$: flexural rigidity L: length of the column Judging from the aforementioned equation (1), it should be noted that the buckling load W is proportional to the flexural rigidity ($E \times I_z$) and a buckling on the long column is thereby effected in the direction of the column in which the flexural rigidity thereof is relatively smaller.

In view of the aforementioned facts, the second embodiment is constituted such that, as shown in FIGS. 10 and 11, for the geometrical moment of inertia I of area of the reinforcing member 62, $I_y$ for the axis of y is larger than $I_x$ for the axis of x (i.e., $I_y > I_x$). Therefore, the reinforcing member 62 is subjected to a buckling deformation in the direction of the arrow R which corresponds to the upper side and the diagonally rear side of the vehicle (also shown in FIG. 12) or in the direction of the arrow R' which corresponds to the lower side and the diagonally front side of the vehicle. As a result, even when the input side collision load is larger than the buckling load of the reinforcing member 62, the seating space of a vehicle occupant on the front seat 10' is not changed, so that a reliable seating space can be obtained.

The second embodiment is constituted such that the buckling deformation direction of the reinforcing member 62 may be controlled by forming the cross section of the reinforcing member 62 into a configuration which allows the flexural rigidity of the reinforcing member 62 in the vertical direction of the vehicle to be smaller than that of the reinforcing member 62 in the longitudinal direction of the vehicle. Accordingly, the degree of freedom at which the flexural rigidities of the reinforcing member 64 in the longitudinal direction of the vehicle and the vertical direction thereof are set can be enhanced by freely choosing a cross-sectional configuration of the reinforcing member 62 which determines the flexural rigidity thereof. As a result, tuning of the reinforcing member 62 in the buckling deformation direction (i.e., the direction of the arrow indicated by R or R' in FIG. 10) can be facilitated.

Further, since the second embodiment is constituted such that the tubular reinforcing member 62 is provided at the outer peripheral portion of the connecting rod 50' to be coaxial therewith and is fixed to the base plate 26' through the plate 64, the same effects as those in the first, second, and third embodiments can be achieved.

Moreover, in accordance with the second embodiment, the reinforcing member 62 whose cross-sectional configuration is substantially oval-shaped has been used. Alternatively, a reinforcing member whose cross-sectional configuration is rectangular-shaped or the like, for example, may be used as long as a cross section of the reinforcing member 62 has a configuration which allows the flexural rigidity of the reinforcing member 62 in the vertical direction of the vehicle to be smaller than the flexural rigidity of the reinforcing member 62 in the longitudinal direction of the vehicle.

Further, the second embodiment is constituted such that the buckling deformation direction of the reinforcing member 62 is controlled by using the reinforcing member 62 having a cross-sectional configuration which allows the flexural rigidity of the reinforcing member 62 in the longitudinal direction of the vehicle to be larger than the flexural rigidity of the reinforcing member 62 in the vertical direction of the vehicle. However, a constitution can be made by combining the constitution of the second embodiment with the constitution of the first embodiment.

Moreover, in accordance with the aforementioned first and second embodiments, when each of the plates 54, 64 is welded to the end portions of each of the reinforcing members 52, 62, the plates 54, 64 and the reinforcing members 52, 62 have been formed into separate pieces, respectively. However, a mounting portion corresponding to each of the plates 54, 64 may be formed into one piece with each of the reinforcing members 52, 62. For example, a plurality of slits, which extend in the axial direction of a reinforcing member at an interval of 90 degrees, are formed at the end portions of the reinforcing member. Namely, a mounting portion is formed by bending four pieces which are formed by those slits toward the diameter direction outer side of the reinforcing member.

In accordance with the aforementioned first and second embodiments, the first embodiment is constituted such that the position of the fixing point of the plate 54 to the base plate 26 is set such that a central point P of the line connecting a pair of fastening points of the plate 54 is placed further toward a front of the vehicle than the centroid Q of the reinforcing member 52. The second embodiment is constituted such that each of the cross sections of the reinforcing member 62 and the supporting portion 64B of the plate 64 has a configuration which allows the flexural rigidities of the reinforcing member 62 and the support point 64B of the plate 64 in the longitudinal direction of the vehicle to be larger than the flexural rigidities of the reinforcing member 62 and the support point 64B of the plate 64 in the vertical direction thereof. However, with relation to the first aspect of the present invention, the constitutions according to the first and second embodiments can be modified in such a manner that a reinforcing member with a low flexural rigidity or a high flexural rigidity is intentionally provided adjacent to a central portion of the reinforcing member at the longitudinal direction thereof by providing a slit, a thin walled portion, a hole, a rib, a bead, or the like, so that the deformation direction of the reinforcing member can be controlled. As described above, with respect to a certain degree of a side collision load, the reinforcing member is required to absorb the side collision load due to a rigidity which is generated between the outer side reclining of apparatus 28' and the inner side reclining apparatus. Therefore, by taking the aforementioned facts into a consideration, it should be noted that the first and second embodiments are more excellent because a plate and a reinforcing member in these embodiments have an uniform cross sectional configuration.

Further, in accordance with the first and second embodiments, each of the reinforcing members 52 and 62 is disposed at the outer peripheral portion of the connecting rod 50, 50' to be coaxial therewith. However, it is not necessary to dispose the reinforcing members 52, 62 to be coaxial with the outer peripheral portion of the connecting rod 50, 50 '. The reinforcing members 52, 62 may be disposed adjacent to the connecting rod 50, 50', respectively.

Moreover, in the aforementioned first and second embodiments, each of the plates 54, 64 is fixed to the end portions of each of the reinforcing members 52, 62 as a mounting portion. However, it is not necessary to use a mounting portion because one of the end portions of each of the reinforcing members 52, 62 may be directly fixed to a structural member of the outer side reclining apparatus 28, 28' and the other of the end portions of each of the reinforcing members 52, 62 may be directly fixed to a structural member of the inner side reclining apparatus 30 by welding or the like. In this case, the cross section of an end portion of the reinforcing member 52 has a circular configuration. Accordingly, fixing the end portions of the reinforcing member 52 directly to a structural member of the outer side reclining apparatus 28 and a structural member of the inner side reclining apparatus 30 merely by welding, or the like, is not sufficient to achieve the aforementioned operation and effects of the first embodiment of the present invention. In this case, each end portion of the reinforcing member 52 may be fixed to the corresponding structural member of the outer side reclining apparatus 28 and the inner side reclining apparatus 30 by effecting welding after each end portion of the reinforcing member 52 has been bulged in an outer diameter direction of the end portion of the reinforcing member 52 by a bulging process or the like so as to form a bulged configuration in which a point of a load to be input to the reinforcing member 52 is positioned closer to the vehicle occupant side than the centroid of the reinforcing member 52.

Further, in the aforementioned first and second embodiments, the end portions of each of the reinforcing members 52, 62 (i.e., each of the plates 54, 64) are fixed to the back end portions 26A, 26A' of the base plates 26, 26', respectively. However, it is not necessary to fix the end portions of each of the reinforcing members 52, 62 to the back end portions 26A, 26A' of the base plates 26, 26', respectively. Accordingly, each end portion of each of the reinforcing members 52, 62 (i.e., the plates 54, 64) may be fixed to a structural member of each of the reclining apparatuses (i.e., the upper gear 46, 46' and the lower gear 40, 40' or the like).

What is claimed is:

1. A vehicle seat structure comprising:
   a connecting member which connects an outer side reclining apparatus in a widthwise direction of a vehicle and an inner side reclining apparatus in the widthwise direction of the vehicle to be interlocked with one another;
   a reinforcing member which is tubular and is provided adjacent to said connecting member, one end portion of said reinforcing member being fixed to a structural member of said outer side reclining apparatus and another end portion of said reinforcing member being fixed to a structural member of said inner side reclining apparatus; and
   deformation direction control means for deforming said reinforcing member in a direction other than a direction in which a seating space of a vehicle occupant becomes narrower, when a side collision load is larger than a buckling load of said reinforcing member.

2. A vehicle seat structure according to claim 1, wherein a cross-sectional configuration of said reinforcing member is formed such that a flexural rigidity of said reinforcing member in a longitudinal direction of the vehicle is larger than a flexural rigidity of said reinforcing member in a vertical direction of the vehicle.

3. A vehicle seat structure according to claim 1, wherein said reinforcing member has mounting portions, each of said mounting portions being provided at an end of said reinforcing member, one of said mounting portions being fixed to the structural member of said outer side reclining apparatus and another of said mounting portions being fixed to the structural member of said inner side reclining apparatus, and said mounting portions being provided so as to extend in a direction orthogonal to an axial direction of said reinforcing member.

4. A vehicle seat structure according to claim 3, wherein said deformation direction control means fixes said mounting portions such that a load input point of the side collision load acting on said mounting portions is positioned further toward a front of the vehicle than an axis of said reinforcing member.

5. A vehicle seat structure according to claim 3, wherein a cross-sectional configuration of said reinforcing member is formed such that a flexural rigidity of said reinforcing member in a longitudinal direction of the vehicle is larger than a flexural rigidity of said reinforcing member in a vertical direction of the vehicle.

6. A vehicle seat structure according to claim 1, wherein a cross-sectional configuration of said reinforcing member is formed such that a flexural rigidity of said reinforcing member in a longitudinal direction of the vehicle is larger than a flexural rigidity of said reinforcing member in a vertical direction of the vehicle.

7. A vehicle seat structure comprising:
   a connecting member which connects an outer side reclining apparatus in a widthwise direction of a vehicle and an inner side reclining apparatus in the widthwise direction of the vehicle to be interlocked with one another;
   a reinforcing member which is tubular and provided at an outer peripheral portion of said connecting member so as to be adjacent to said connecting member, one end portion of said reinforcing member being fixed to a structural member of said outer side reclining apparatus and another end portion of said reinforcing member being fixed to a structural member of said inner side reclining apparatus; and
   deformation direction control means for deforming said reinforcing member in a direction other than a direction in which a seating space of a vehicle occupant becomes narrower, when a side collision load is larger than a buckling load of said reinforcing member.

8. A vehicle seat structure according to claim 7, wherein said reinforcing member has mounting portions, each of said mounting portions being provided at an end of said reinforcing member, one of said mounting portions being fixed to the structural member of said outer side reclining apparatus and another of said mounting portions being fixed to the structural member of said inner side reclining apparatus, and said mounting portions being provided so as to extend in a direction orthogonal to an axial direction of said reinforcing member.

9. A vehicle seat structure according to claim 8, wherein said deformation direction control means fixes said mounting portions such that a load input point of the side collision load acting on said mounting portions is positioned further toward a front of the vehicle than an axis of said reinforcing member.

10. A vehicle seat structure according to claim 8, wherein a cross-sectional configuration of said reinforcing member is formed such that a flexural rigidity of said reinforcing member in a longitudinal direction of the vehicle is larger than a flexural rigidity of said reinforcing member in a vertical direction of the vehicle.

11. A vehicle seat structure according to claim 8, wherein said deformation direction control means fixes said mounting portions such that a load input point of the side collision load acting on said mounting portions is positioned closer to the vehicle occupant than an axis of said reinforcing member.

12. A vehicle seat structure according to claim 8, wherein said deformation direction control means fixes said mounting portions such that a load input point of the side collision load acting on said mounting portions is positioned below an axis of said reinforcing member.

13. A vehicle seat structure according to claim 8, wherein said deformation direction control means fixes said mounting portions such that a load input point of the side collision load acting on said mounting portions is positioned further toward a front of the vehicle and lower than an axis of said reinforcing member.

14. A vehicle seat structure comprising:
   a connecting member which connects an outer side reclining apparatus in a widthwise direction of a vehicle and an inner side reclining apparatus in the widthwise direction of the vehicle to be interlocked with one another;
   a reinforcing member which is tubular and provided at an outer peripheral portion of said connecting member so as to be adjacent to said connecting member, one end portion of said reinforcing member being fixed to a structural member of said outer side reclining apparatus and another end portion of said reinforcing member being fixed to a structural member of said inner side reclining apparatus, said reinforcing member having plates, each of said plates being provided at an end of said reinforcing member, one of said plates being fixed to the structural member of said outer side reclining apparatus and another of said plates being fixed to the structural member of said inner side reclining apparatus, and said plates being provided so as to extend in a direction orthogonal to an axial direction of said reinforcing member; and
   deformation direction control means for deforming said reinforcing member in a direction other than a direction in which a seating space of a vehicle occupant becomes narrower, when a side collision load is larger than a buckling load of said reinforcing member.

15. A vehicle seat structure according to claim 14, wherein a cross-section of said reinforcing member is formed into a substantially oval-shaped configuration which allows a flexural rigidity of said reinforcing member in a longitudinal direction of the vehicle to be larger than a flexural rigidity of said reinforcing member in a vertical direction of the vehicle.

16. A vehicle seat structure according to claim 14, wherein said deformation direction control means has a screw member, said screw member fixes said plates such that a load input point of the side collision load acting on said plates is positioned further toward a front of the vehicle than an axis of said reinforcing member.

* * * * *